C. FORTH.
PIPE COUPLING.
APPLICATION FILED MAY 25, 1908.
950,665.
Patented Mar. 1, 1910.
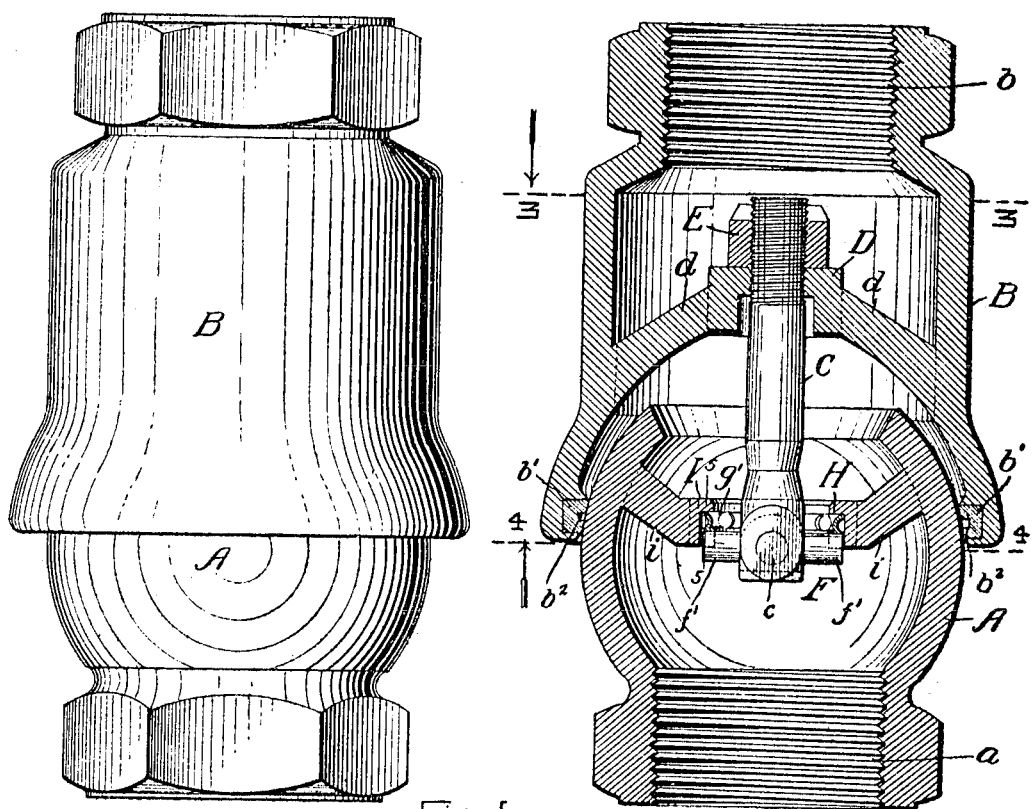
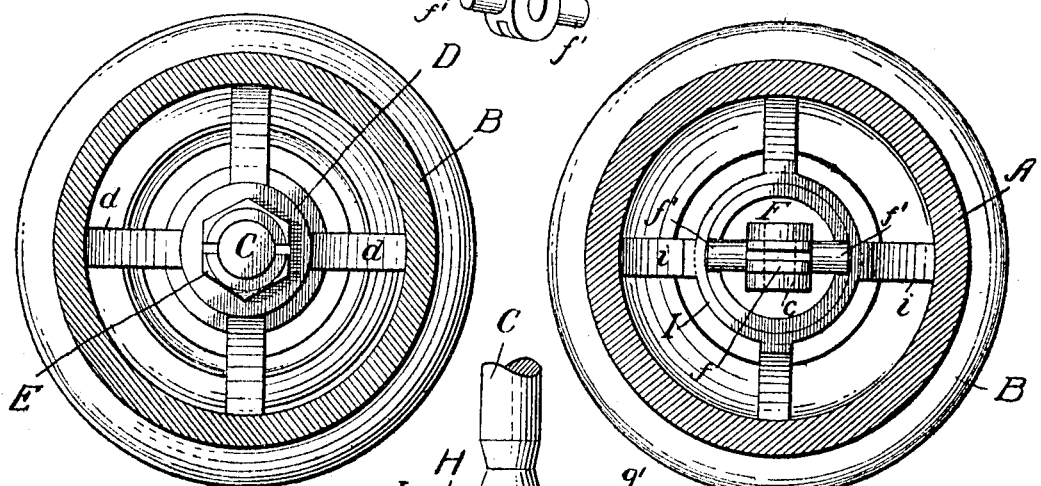
WITNESSES:
L. E. Morrison
M. E. Smoot
INVENTOR:
Charles Forth
By his Attorney
Robert Fletcher Rogers

UNITED STATES PATENT OFFICE.

CHARLES FORTH, OF WINTHROP, MASSACHUSETTS.

PIPE-COUPLING.

950,665.  Specification of Letters Patent.  Patented Mar. 1, 1910.

Application filed May 25, 1908. Serial No. 434,706.

*To all whom it may concern:*

Be it known that I, CHARLES FORTH, a citizen of the United States, residing at Winthrop, in the county of Suffolk and State of Massachusetts, have invented certain new and useful Improvements in Pipe-Couplings, of which the following is a specification, reference being had therein to the accompanying drawing.

This invention relates to pipe couplings of the type in which provision is made for a universal pivotal movement of the connected pipes, and has reference more particularly to couplings of this character known as "ball and socket" couplings, in which one member is in the form of a spherical head or ball and the other member in the form of a socket or cup to receive the ball, the two being connected together in such manner that the ball is permitted to work freely in the socket in all directions, while at the same time a tight joint is maintained between the parts.

The invention is directed particularly to the production of a metal coupling of this form for use in connection with steam or air pipes on railway trains where the conditions are such that the coupling is subjected to constant flexure with consequently more liability to leakage, and the invention consists in an improved construction of the two coupling members, and in improved means for connecting said members together; whereby while they will be held together with sufficient firmness to effectually prevent the escape of the fluid under pressure, they will at the same time be allowed great freedom of movement in all directions with a minimum of friction and wear.

The invention consists also in the details of construction and combination of parts hereinafter described and claimed.

In the accompanying drawings:—Figure 1 is a side elevation of my improved coupling. Fig. 2 is a longitudinal central section through the same. Fig. 3 is a transverse section on the line 3—3 of Fig. 2, looking downward. Fig. 4 is a similar view on the line 4—4 of Fig. 2 looking upward. Fig. 5 is a vertical sectional elevation on the line 5—5 of Fig. 2. Fig. 6 is a perspective view of a detail.

Referring to the drawings:—my improved coupling comprises a spherical head or ball A with an opening extending longitudinally through it, and a socket or cup B also with a longitudinally extending opening; and a longitudinally extending coupling member or bolt C fixed in the socket member and connected with the interior of the head in such manner as to permit the head and socket to assume different angular relations and prevent their separation. The head and socket members are adapted at their outer ends to be attached, in any suitable manner, to the terminals of the pipes to be coupled, these members being in the present instance provided with interiorly threaded necks $a$, $b$ respectively to receive threaded sleeves connected with the ends of the pipes (not shown.)

The connecting bolt C is threaded at its outer end and screwed into an opening in a hub D sustained centrally within the socket member by means of diametrically arranged radial arms $d$ connected respectively with said head and with the socket, a nut E being applied to the threaded extremity of the bolt and serving to lock it in position. The bolt extends longitudinally and centrally of the socket member, a short distance beyond the inner end of the same and into the open end of the head A, which latter extends some distance into the socket so as to receive a bearing from the inner surface of the socket at its inner edge, at which point the socket is preferably formed with an annular groove to receive a packing $b'$ of Babbitt or other soft metal. The end of the bolt within the head is provided with an open longitudinal slot, in which is pivoted by means of a transverse pivot pin $c$, a stud or journal F of the form shown in Fig. 6 and consisting of a flat central body portion $f$ and two oppositely extending cylindrical arms $f'$, the body portion being seated in the slot in the bolt and pivoted therein by the pin $c$, and the two cylindrical arms extending outwardly at opposite sides of the bolt as shown in Fig. 2 and at right angles to the axis of the pivot pin. The projecting journal arms $f'$ have a bearing in semi-circular sockets $g$ in one edge of a bearing ring G formed on its opposite edge with stiff spring fingers $g'$ seated so as to turn freely against an annular shoulder or flange H projecting inwardly from an opening in a hub I sustained centrally within the head A by means of radial arms $i$ connected with the hub and with the head. As a result of this construction, the bolt C may rock in the head on two axes disposed at right angles to each other, the one being formed by the journal arms $f'$ and the other by the pivot pin $c$, and by reason of the fact that the ring G, which affords a bearing for the journal arms, is freely movable around in the hub I, the two parts of the bearing may assume angular relations, not only on the two right angularly disposed axes, but on axes at all intermediate points, the swiveling motion of the bearing ring permitting the axes on which the bolt rocks, to be adjusted with reference to the head by the tendency of the coupling to flexure at different angles. The effect of the construction described is therefore to connect the two members of the coupling in such manner that they may turn relatively around a longitudinal axis, and may rock relatively on a transverse axis. The spring fingers $g'$ possess but a slight degree of resiliency, and by bearing against the annular shoulder H, are subjected to compression by the endwise pull or strain on the bolt C; and in assembling the parts this strain is so adjusted that the compression will be such as to hold the parts together to form a tight joint, without setting up an objectionable amount of friction. The two axes, formed respectively by the journal arms and pivot pin, are coincident although right angularly disposed with relation to each other, and the curvature of the external surface of the head A and its relation to these axes is such that the point of intersection of the two axes is situated at the internal center of this surface. As a result the strain on the connecting bolt will be uniform and unaffected by the difference in direction of flexure assumed by the parts of the coupling.

The provision of the soft metal packing $b'$ in the socket member B is of advantage, in that in the event of sand or dirt or other foreign substances lodging between the packing and the surface of the ball A, these substances will become embedded in the soft metal and will not therefore scratch the surface of the head. I propose in order to keep the parts lubricated, to form in the packing $b'$ a groove $b^2$ to receive a thick lubricant.

Having thus described my invention, what I claim is:—

1. In a pipe coupling, the combination with a ball member and a socket member, of an internal longitudinally extending connecting device fixed to one of said members, a bearing member mounted within the other member and movable around a longitudinal axis, and a pivotal connection between the bearing member and the connecting device.

2. In a pipe coupling, the combination with a ball member and a socket member, of a longitudinally extending connecting bolt fixed to the socket member, a bearing ring mounted in the ball member and movable around a longitudinal axis, and journal arms on the connecting bolt having a pivotal bearing in the ring.

3. In a pipe coupling, the combination with a ball member and a socket member, of a longitudinally extending connecting bolt fixed to the socket member, a bearing member mounted in the ball member and movable around a longitudinal axis, journal arms mounted on the bolt on a transverse axis and mounted in the bearing member to rock on a transverse axis disposed at right angles to the axis of the arms.

4. In a pipe coupling, the combination with a ball member and a socket member, of a longitudinally extending connecting device fixed to one of said members, a bearing member mounted in the other member and movable around a longitudinal axis, the said connecting device being jointed to the bearing member to rock on two transverse axes disposed at right angles to each other.

5. In a pipe coupling, the combination with a ball member and a socket member, of a bearing member mounted in one of said members and yieldable longitudinally, and a longitudinally extending connecting device fixed to the other member and connected with the bearing member to rock thereon on a transverse axis.

6. In a pipe coupling, the combination with a ball member and a socket member, of a resilient bearing ring mounted in the ball member and movable around a longitudinal axis, and a connecting device fixed to the socket member and extending longitudinally and pivoted to the bearing ring.

7. In a pipe coupling, the combination with a ball member provided with an annular shoulder, of a socket member, a bearing ring formed on one side with spring fingers seated against said annular shoulder and movable around a longitudinal axis, a longitudinally extending connecting bolt fixed to the socket member, and journal arms on the bolt bearing against the side of the ring opposite the spring fingers.

8. In a pipe coupling, the combination with a ball member and a socket member, of a longitudinally extending connecting device fixed to one of said members, a longitudinally yielding bearing member mounted in the other member to rotate around a longitudinal axis, and a pivotal connection between said bearing member and the connecting device.

9. In a pipe coupling, the combination with a ball member and socket member, of an internal connecting device mounted in one of said members, a bearing member mounted within the other member and movable relatively to said other member about a longitudinal axis, and a pivotal connection between the bearing member and connecting device.

10. In a pipe coupling, the combination with a ball member and a socket member, of an internal connecting device carried by one of said members and extending longitudinally into the other member and pivotally connected to said other member so as to rock relatively to said other member on a transverse axis, said pivotal connection being free to adjust itself relatively to said other member around a longitudinal axis to cause the transverse axis to assume different relative positions.

11. In a pipe coupling, the combination with a ball member and a socket member, of a connecting device carried by the socket member and pivotally connected to the other member so as to rock relatively to the latter on two transverse axes disposed in fixed relations angularly to each other, and means whereby said axes may be moved about a longitudinal axis relatively to the ball member.

In testimony whereof I have affixed my signature in presence of two witnesses.

CHARLES FORTH.

Witnesses:
FRANK G. PARKER,
JOHN BUCKLER.